UNITED STATES PATENT OFFICE 2,422,621

VITAMIN B6 INTERMEDIATES

Stanton A. Harris, Westfield, N. J., assignor to Merck & Co., Inc., Rahway, N. J., a corporation of New Jersey No Drawing. Original application January 24, 1942, Serial No. 428,080, which is a division of application Serial No. 293,131, September 1, 1939. Divided and this application July 28, 1944, Serial No. 547,106

3 Claims. (Cl. 260—297)

This invention relates to the synthesis of vitamin B6 and to various intermediates employed in the synthesis, and is a division of my co-pending application Serial No. 428,080, filed January 24, 1942, which is a division of application Serial No. 293,131, filed September 1, 1939, now Patent No. 2,272,198, issued February 10, 1942.

In a co-pending application, Serial No. 267,603, it is disclosed that 2-methyl-3-amino-4-ethoxymethyl-5-aminomethylpyridine dihydrochloride can be diazotized to produce 2-methyl-3-hydroxy-4-ethoxymethyl-5-hydroxymethylpyridine which is converted to vitamin B6 by treatment with concentrated hydrobromic acid to form 2-methyl-3-hydroxy-4,5-di-(bromomethyl) pyridine hydrobromide, boiling the latter compound with water to hydrolyze the bromomethyl radicals to hydroxymethyl radicals, and removing the bromide ion by means of silver or suitable neutralization, concentration and extraction methods.

According to this invention it is found that a dihydrohalide of 2-methyl-3-amino-4-alkoxymethyl-5-aminomethylpyridine can be diazotized to form 2-methyl-3-hydroxy-4-alkoxymethyl-5-hydroxymethylpyridine which when treated with a concentrated hydrohalogen acid forms 2-methyl-3-hydroxy-4,5-di-(halogenmethyl) pyridine, which can be converted to vitamin B6 by hydrolysis.

I have also discovered that, when 2-methyl-3-hydroxy-4-alkoxymethyl-5-hydroxymethylpyridine is treated with 50 or 60% sulfuric acid as disclosed in the above identified co-pending application, during the hydrolysis some ring closure occurs to form 2-methyl-3-hydroxy-4,5-epoxydimethylpyridine of the following structure:

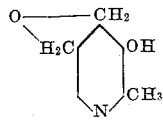

The hydrochloride of this compound is also formed to some extent when 2-methyl-3-hydroxy-4,5-di-(bromomethyl) pyridine is treated with silver chloride in the presence of water.

The compounds of the present invention may be represented by the general formulae:

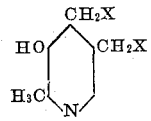

wherein X is a halogen.

The following examples illustrate methods of carrying out the present invention, but it is to be understood that these examples are given by way of illustration and not of limitation.

*Example 1*

300 grams of 2-methyl-3-amino-4-ethoxymethyl-5-aminomethylpyridine dihydrochloride are dissolved in 430 cc. of water, neutralized with sodium hydroxide in phenolphthalein and 540 grams sodium nitrite are added. This solution is added slowly to 6500 cc. of hot (90° C.) 2 N sulfuric acid with stirring. There is an immediate evolution of nitrogen, followed by the formation of a slightly yellow solution. The solution is heated for an additional 15 minutes, treated with just enough urea to decompose the excess nitrous acid, cooled, and neutralized to pH 7.2 with sodium hydroxide solution, using bromothymol blue as an outside indicator. The slightly reddish solution is concentrated under diminished pressure until sodium sulfate starts to separate. At this point a black, oily layer is formed, which contains most of the desired product. It is dissolved in 2¼ kg. acetone, filtered from separated sodium sulfate, and evaporated to dryness. The residue is then redissolved to 2¼ kg. of acetone, filtered from the separated sodium chloride, and evaporated to dryness. It is taken up a third time in 2¼ kg. of acetone, filtered from an insoluble material and diluted with an equal volume of ether, whereupon a dark red oil separates. The supernatant liquid is decanted and filtered with the aid of carboraffin. The slightly yellow solution is evaporated to a syrup; yield of 2-methyl-3-hydroxy-4-ethoxymethyl-5-hydroxymethylpyridine is 120 grams or about 50% of the theory. Additional material can be obtained from the precipitated oil and by elution of the charcoal with acetone.

Fifty grams of the above material are dissolved in 500 cc. of acetone and treated with dry hydrogen chloride until the solution is acid to wet Congo paper whereupon a brown colored hydrochloride crystallizes out. The addition of ether yields some additional crystals. These crystals are twice recrystallized by dissolving in a minimum of alcohol and adding an equal volume of acetone and filtering with the aid of carboraffin. The yield is 25.3 g. or 21.5% of the theory based on the original diamine; M. P. 135–136° C. Additional crystals may be obtained from the mother liquors.

0.2 gram of 2-methyl-3-hydroxy-4-ethoxymethyl-5-hydroxymethylpyridine hydrochloride are dissolved in 6 cc. of concentrated hydrochloric acid and heated for one hour in a constant temperature bath at 132° C. The tube is cooled in ice, opened and crystallization is induced by scratching. The crystals are recrystallized from concentrated hydrochloric acid; melting point about 206° C. after considerable darkening, starting at 195° C. The yield of recrystallized 2-methyl-3-hydroxy-4,5-di-(chloromethyl) pyridine hydrochloride is about 0.09 gram or 43%. Additional crystals may be obtained from the mother liquor.

0.05 gram of 2-methyl-3-hydroxy-4,5-di-(chloromethyl) pyridine hydrochloride is dissolved in 10 cc. of water and heated for one hour at 100° C. The solution is evaporated almost to dryness and the vitamin $B_6$ hydrochloride recrystallized from alcohol and acetone.

*Example 2*

3.7 grams of 2-methyl-3-hydroxy-4,5-epoxy-dimethyl-pyridine hydrobromide prepared for example as described in my copending application Serial No. 428,080 above mentioned, is mixed with 60 cc. of 48% hydrobromic acid and distilled until about one-half of the acid is removed. The solution is cooled in ice, whereupon the 2-methyl-3-hydroxy-4,5-di-(bromomethyl) pyridine hydrobromide crystallizes. The total yield is 6.42 grams (86.5%); M. P. 228.5° C. This compound can be hydrolyzed to vitamin $B_6$ by boiling with water, followed by treatment with silver chloride.

Modifications may be made in carrying out the present invention without departing from the spirit and scope thereof, and the invention is to be limited only by the appended claims.

What is claimed is:

1. In the synthesis of vitamin $B_6$, the step which comprises heating 2-methyl-3-hydroxy-4:5-epoxydimethylpyridine hydrobromide with hydrobromic acid to form 2-methyl-3-hydroxy-4:5-di-(bromomethyl) pyridine hydrobromide.

2. In the synthesis of vitamin $B_6$, the step which comprises heating 2-methyl-3-hydroxy-4:5-epoxydimethylpyridine hydrohalide with hydrohalic acid to form 2-methyl-3-hydroxy-4:5-di-(halomethyl) pyridine hydrohalide.

3. In the synthesis of vitamin $B_6$, the step which comprises heating 2-methyl-5-hydroxy-4:5-epoxydimethylpyridine hydrochloride with hydrochloric acid to form 2-methyl-3-hydroxy-4:5-di-(chloromethyl) pyridine hydrochloride.

STANTON A. HARRIS.

REFERENCES CITED

The following references are of record in the file of this patent:

UNITED STATES PATENTS

| Number | Name | Date |
| --- | --- | --- |
| 2,286,915 | Kuhn | June 16, 1942 |

OTHER REFERENCES

Berichte, 72 pp. 305–12, Feb. 9, 1939.
"Nature Wessenschaften," July 7, 1939, pp. 469–70.